(12) United States Patent
Hoshikawa

(10) Patent No.: US 10,320,108 B2
(45) Date of Patent: Jun. 11, 2019

(54) ROTATION TERMINAL DEVICE FOR PORTABLE TERMINALS AND ELECTRIC LAMP

(71) Applicant: Trinity, Inc., Niiza-shi, Saitama (JP)

(72) Inventor: Tetsushi Hoshikawa, Niiza (JP)

(73) Assignee: TRINITY, INC., Niiza-Shi, Saitama (JP)

( * ) Notice: Subject to any disclaimer, the term of this patent is extended or adjusted under 35 U.S.C. 154(b) by 0 days.

(21) Appl. No.: 15/740,023

(22) PCT Filed: Jun. 29, 2015

(86) PCT No.: PCT/JP2015/068705
§ 371 (c)(1),
(2) Date: Dec. 27, 2017

(87) PCT Pub. No.: WO2017/002177
PCT Pub. Date: Jan. 5, 2017

(65) Prior Publication Data
US 2018/0191096 A1    Jul. 5, 2018

(51) Int. Cl.
*H01R 13/44* (2006.01)
*F21S 6/00* (2006.01)
(Continued)

(52) U.S. Cl.
CPC .......... *H01R 13/44* (2013.01); *F21S 6/00* (2013.01); *F21S 6/002* (2013.01); *F21V 21/06* (2013.01);
(Continued)

(58) Field of Classification Search
CPC .................. H01R 35/04; H01R 13/44
See application file for complete search history.

(56) References Cited

U.S. PATENT DOCUMENTS

| | | | | | |
|---|---|---|---|---|---|
| 3,622,684 | A | * | 11/1971 | Press | H02G 3/185 174/484 |
| 5,755,582 | A | * | 5/1998 | Charlton | H02G 3/185 292/219 |

(Continued)

FOREIGN PATENT DOCUMENTS

| | | |
|---|---|---|
| JP | 3080426 U | 9/2001 |
| JP | 3154556 U | 10/2009 |

(Continued)

OTHER PUBLICATIONS

International Search Report, dated Jul. 21, 2015 (2 pages).

*Primary Examiner* — Tho D Ta
(74) *Attorney, Agent, or Firm* — Jacobson Holman, PLLC.

(57) ABSTRACT

A terminal device which is used for charging of portable terminals and data communication, the device including a terminal holder including at least one terminal, a device main body 12 including an opening for mounting the terminal holder, which is configured such that a decorative surface constituting a portion of the device main body is provided on one surface of the terminal holder and the terminal is provided on the other surface and is rotatably attached to the device main body by a rotation mechanism, and is configured so the terminal protrudes the front surface side of the main body in a use state and the decorative surface appears on the front surface side.

4 Claims, 6 Drawing Sheets

(51) Int. Cl.
*H04M 1/04* (2006.01)
*H04M 1/21* (2006.01)
*F21V 21/06* (2006.01)
*H01R 33/74* (2006.01)
*F21V 33/00* (2006.01)
*G06F 1/16* (2006.01)
*H01R 35/04* (2006.01)
*H04M 19/08* (2006.01)
*H04M 1/02* (2006.01)

(52) U.S. Cl.
CPC ........ *F21V 33/0052* (2013.01); *G06F 1/1632* (2013.01); *H01R 33/74* (2013.01); *H04M 1/04* (2013.01); *H04M 1/21* (2013.01); *H01R 35/04* (2013.01); *H04M 1/0274* (2013.01); *H04M 19/08* (2013.01)

(56) References Cited

U.S. PATENT DOCUMENTS

| | | | |
|---|---|---|---|
| 7,407,392 B2* | 8/2008 | Cooke | A47B 21/06 108/62 |
| 7,621,764 B2* | 11/2009 | Shunjie | H01R 13/44 174/480 |
| 7,771,239 B1* | 8/2010 | Hsiao | H01R 35/04 439/640 |
| 8,007,295 B2* | 8/2011 | Lin | A47B 21/06 439/131 |
| 9,197,839 B2* | 11/2015 | Lin | G06F 1/1613 |
| 9,601,860 B2* | 3/2017 | Byrne | H01R 27/02 |
| 2011/0124210 A1* | 5/2011 | Lai | G06F 1/1632 439/131 |
| 2011/0157801 A1* | 6/2011 | Satterfield | G06F 1/1607 361/679.01 |
| 2012/0188691 A1 | 7/2012 | Zhou | |
| 2015/0380854 A1* | 12/2015 | Oosterman | H01R 13/44 439/131 |

FOREIGN PATENT DOCUMENTS

| | | |
|---|---|---|
| JP | 2012-9087 A | 1/2012 |
| JP | 2012-234084 A | 11/2012 |
| JP | 2013-55818 A | 3/2013 |
| JP | 2014-517400 A | 7/2014 |
| JP | 2015-502128 | 1/2015 |

* cited by examiner

ROTATION TERMINAL DEVICE FOR PORTABLE TERMINALS AND ELECTRIC LAMP

BACKGROUND OF THE INVENTION

Technical Field

The present invention relates to a rotation terminal device for portable terminals which are used for purposes including charging of portable terminals and data communication, and an electric lamp having the rotation terminal device for portable terminals embedded therein.

Background Art

Portable terminals such as iPhone (registered trademark) include a terminal such as Lighting connector or micro-USB to perform charging or data communication. Each of the terminal apparatuses is provided with a rest for both charging and communication, which is called a cradle, for cases such as when there is a desire to operate a screen of the portable terminal while performing charging. However, in a cradle of the related art, a terminal is opened when a portable terminal is not connected thereto, which results in damage or contamination, and thus there is a problem in that a show is deteriorated and appearance is impaired.

In addition, when a portable terminal having a different shape is connected to the cradle or when a portable terminal is connected thereto in a state where a protection case or the like is mounted thereon, it is necessary to adjust a dimension difference between the back of the portable terminal and a portion supporting the portable terminal. For this reason, in the related art, countermeasures such as the use of an attachment or the movement of a supporting position are required. However, such countermeasures are inconvenient and result in the damage of the terminal or the like in an inappropriate case.

According to the examination of related art, Japanese Unexamined Patent Application Publication (Translation of PCT Application) No. 2015-502128 regarding a charging device of a mobile device has been found. The invention disclosed in the related art has a configuration in which a mobile device and a charging stationary stand are magnetically coupled to each other and an electric terminal is matched. However, a portable terminal is held by a terminal case, and the terminal case is magnetically coupled to the charging stationary stand. In addition, when the portable terminal is replaced, it is necessary to replace the terminal case with an appropriate terminal case due to the terminal case needs an exclusive terminal case. In addition, it cannot be said that a configuration of the device is simple, and the number of parts thereof is not also small.

PATENT LITERATURE

Japanese Unexamined Patent Application Publication (Translation of PCT Application) No. 2015-502128

BRIEF SUMMARY OF INVENTION

Technical Problem

The invention is contrived in view of the above-described respects, and an object thereof is to provide a rotation terminal device for portable terminals which protects a terminal from damage or contamination in a non-use state and prevents appearance from being impaired. In addition, another object of the invention is to allow the portable terminal is appropriately supported even when there is a change in the shape or size of the portable terminal. Further, still another object of the invention is to provide an electric lamp which is configured to have the rotation terminal device for portable terminals embedded therein.

Solution to Problem

In order to solve the above-described problem, the invention devises means for a terminal device which is used for purposes including charging of portable terminals and data communication, the device including a terminal holder that includes at least one terminal, and a device main body that includes an opening for mounting the terminal holder, in which the terminal holder is configured such that a decorative surface constituting a portion of the device main body is provided on one surface of the terminal holder and the terminal is provided on the other surface thereof, is rotatably attached to the device main body by a rotation mechanism, and is configured such that the terminal protrudes on a front surface side of the device main body in a use state of the terminal holder and the decorative surface appears on the front surface side to constitute a portion of the device main body in a non-use state of the terminal holder.

In the rotation terminal device of the invention, the terminal holder is rotated by the rotation mechanism, the terminal holder is configured such that one surface serves as the decorative surface and the other surface serves as a surface provided with the terminal, and the terminal appears in a use state of the terminal and the decorative surface appears in a non-use state of the terminal on the front surface side of the device main body. Therefore, the terminal holder is rotatable at substantially 180 degrees.

In this configuration, the decorative surface serving as one surface of the terminal holder is not required to be a surface to which dressing or decoration is applied, but is assumed to be a surface that does not impair the appearance of the surface (hereinafter, referred to as a device main body surface) of an installation portion constituting a portion of the device main body. For example, when the device main body surface is a flat surface, the decorative surface can also be configured as a flat surface. However, device main body surface can also be provided with, for example, a mark, a relief, or the like, which can be applied to the decorative surface.

In the invention, there is provided a preferred configuration in which the terminal holder may include an engagement portion, and the device main body may include a to-be-engaged-portion to be engaged with the engagement portion within the opening of the device main body, so that terminal holder is configured to be fixed at a position where the terminal appears on the front surface side or at a position where the decorative surface appears by the engagement between the engagement portion and the to-be-engaged-portion. The terminal holder is fixed at the inverted position by the engagement configuration.

Further, in the device of the invention, there is a preferred configuration in which the device main body may include a supporting body, the supporting body may function as a support that supports the portable terminal at a back thereof when the portable terminal is connected to the terminal, and a change in an angle of backward inclination, which varies depending on a difference in a size of the portable terminal, may be adjusted by the rotation mechanism of the terminal holder, and the supporting body may include a stopper that holds the portable terminal in an upper portion of the supporting body. In this case, the rear of the terminal holder is supported by the supporting body, and thus it is possible to stably support and use portable terminals for purposes such as charging without depending on the above-described engagement.

In addition, the invention provides an electric lamp with a rotation terminal device for portable terminals, the electric lamp including a base for use on a desk, a floor, and the like, an illumination unit which is provided on the base, and the rotation terminal device for portable terminals, according to claim 1, which is embedded in the base. There is a concern for contamination or damage by merely installing the terminal on the surface of the base, which also leads to a problem in a view of appearance. However, appearance is not impaired by adopting the above-described configuration, and it is also possible to bring a new sense of beauty depending on design.

In the electric lamp, the base may also serve as the device main body, the base may be provided with a column that also serves as the supporting body, and the illumination unit may be provided in an upper portion of the column. Therefore, when the column is provided as the supporting body at the back of the terminal holder in a rotation direction, it is not necessary to expressly provide the supporting body.

Advantageous Effects of Invention

The invention is configured and acts as described above, and exhibits an effect which is capable of providing a rotation terminal device for portable terminals which protects a terminal from damage or contamination in a non-use state and prevents appearance from being impaired. In addition, according to the invention, there is an effect that it is possible to appropriately support the portable terminal by changing the angle of inclination of a terminal holder even when there is a change in the shape or size of the portable terminal. Further, according to the invention, it is possible to provide an electric lamp which is configured to include the rotation terminal device for portable terminals embedded therein and has an excellent appearance.

BRIEF DESCRIPTION OF THE DRAWINGS

FIG. 4 consists of FIGS. 4A and 4B and is an enlarged view of an engagement structure of the terminal holder.

FIG. 5 consists of FIGS. 5A and 5B and illustrates changes in the position of the terminal holder.

DETAILED DESCRIPTION OF THE INVENTION

Figure 1:
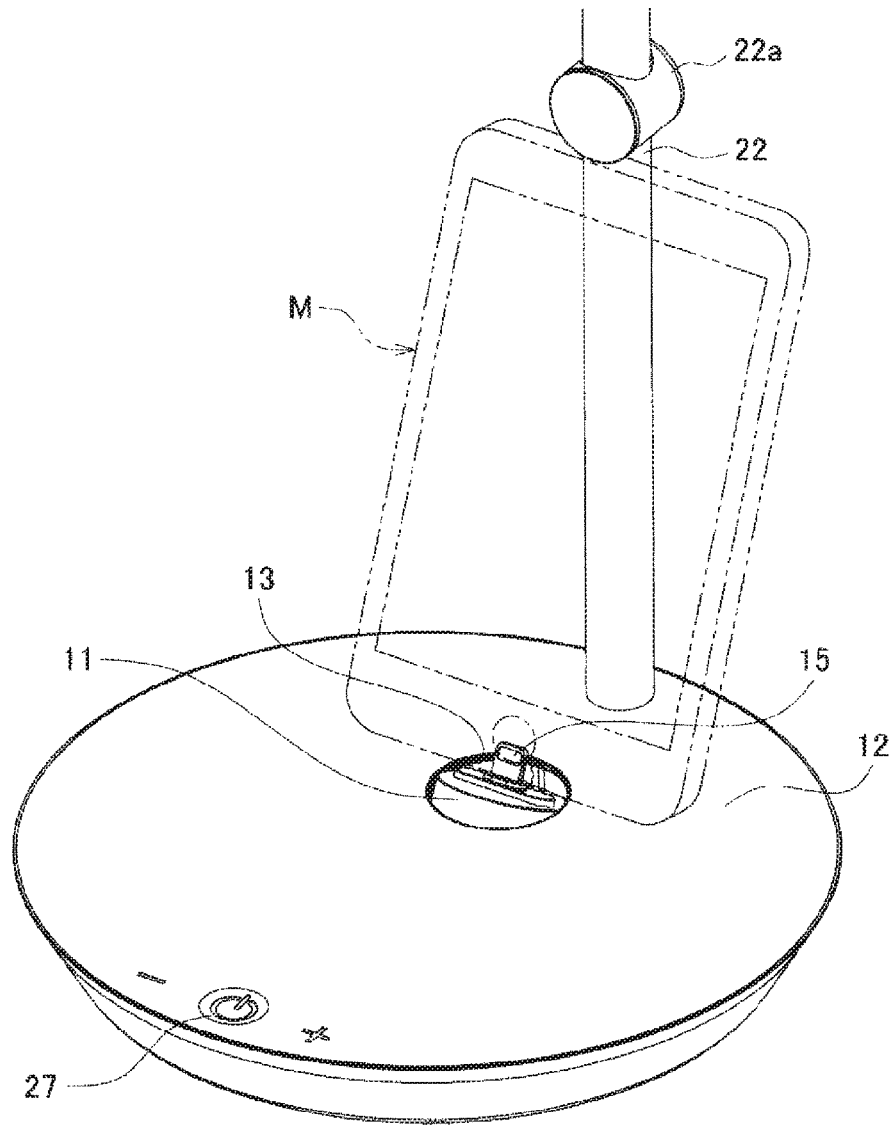
FIG. 1 is a perspective view of an example of a rotation terminal device for portable terminals according to the invention when a terminal is used.

Hereinafter, the invention will be described in more detail with reference to examples shown in the drawings. In FIG. 1, reference numeral 11 denotes a terminal holder, reference numeral 12 denotes a device main body, and the device main body 12 includes an opening 13 for mounting the terminal holder 11. The device main body 12 has a surface which is formed to be flat as a whole, and is provided with the opening 13 on a substantially rear side of the center portion thereof.

Figure 2:
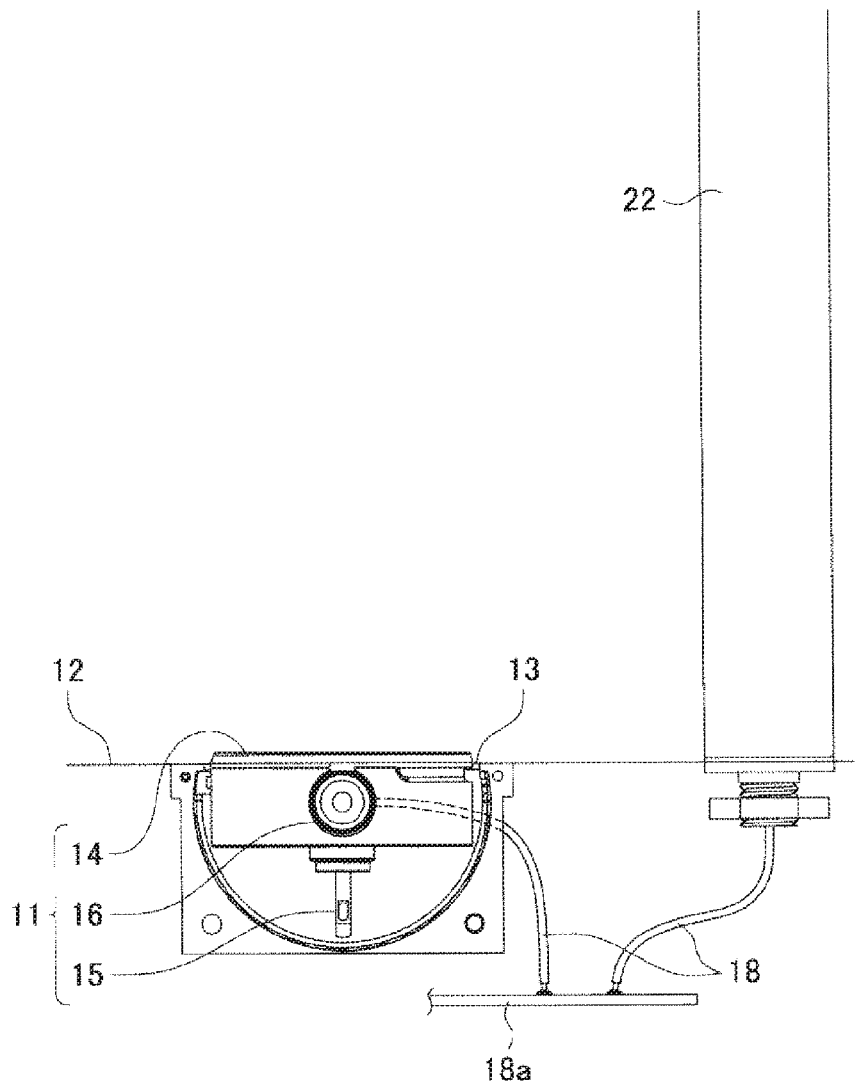
FIG. 2 is a cross-sectional view illustrating a state when the terminal is not used in the rotation terminal device for portable terminals.

The terminal holder 11 is configured to have a flat decorative surface 14 on one surface thereof so as to constitute a portion of the device main body 12, and to have a terminal 15 on the other surface thereof, and is rotatably attached to the device main body 12 by a rotation mechanism 16 (see FIG. 2). The rotation mechanism 16 includes a short axis 16a provided on the side surface of the terminal holder 11 and an axis opening 16b provided on the device main body side, and is configured such that the short axis 16a is rotatably attached so as to fit into the axis opening 16b (see FIG. 3).

Figure 3:
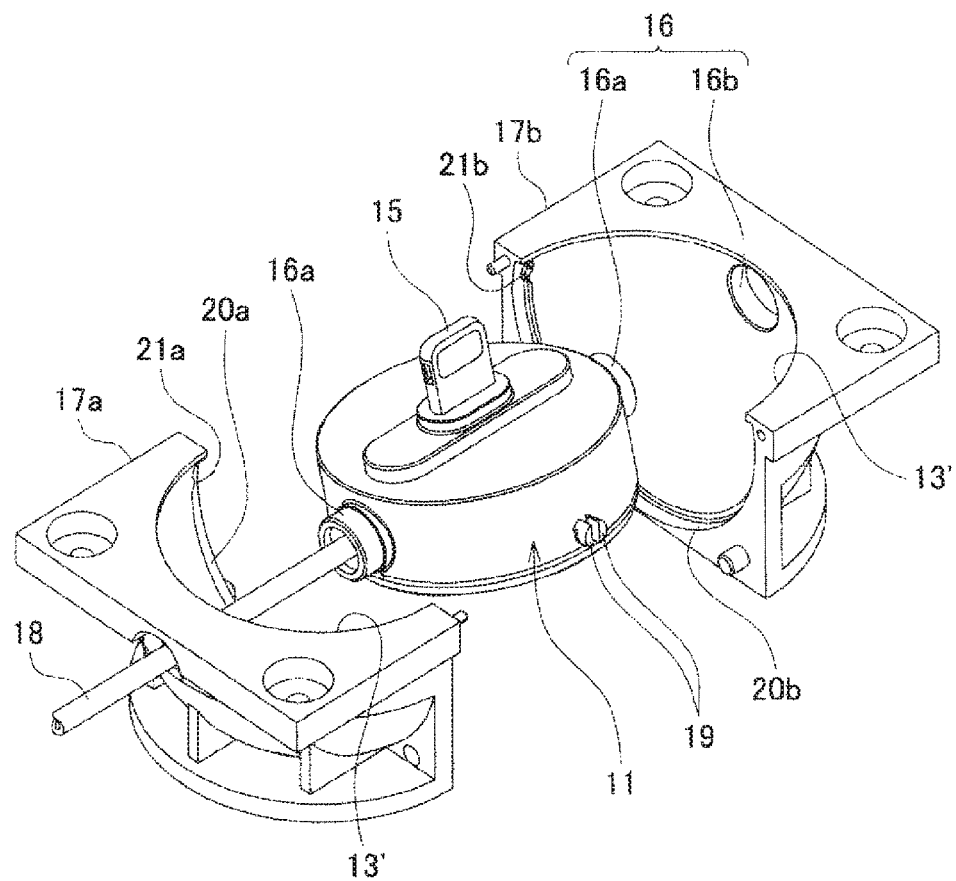
FIG. 3 is an exploded perspective view illustrating a configuration of the rotation terminal device for portable terminals.

In the example shown in the drawing, the terminal holder 11 is formed to have a substantially disk shape, is configured such that the short axis 16a is provided in the diameter direction of the outer peripheral surface thereof, and is disposed in a substantially hemispherical blank space of a pair of casings 17a and 17b in which the terminal holder is accommodated (see FIG. 3). The rotation mechanism 16 also serves as a lead-in inlet of a wiring cord 18, an end of the wiring 18 leads to a power supply, and the other end is connected to the terminal 15. Meanwhile, reference numeral 13' denotes a casing opening, and reference numeral 18a denotes a control substrate.

The terminal holder 11 includes an engagement portion 19, and the device main body 12 includes to-be-engaged-portions 21a and 21b to be engaged with the engagement portion 19 within the opening 13 of the device main body 12. The terminal holder is configured to be fixed at a position where the terminal 15 appears on the front surface side or at a position where the decorative surface 14 appears by engagement between the engagement portion 19 and the to-be-engaged-portions 21a and 21b.

The engagement portion 19 shown in the drawings includes a pair of protrusions provided on the outer peripheral surface of the terminal holder in an axial direction orthogonal to a short axis direction, and is provided so as to be elastically deformable by a slight amount (see FIG. 3). The to-be-engaged-portions 21a and 21b are respectively provided at the ends of respective engagement portion sliding grooves 20a and 20b formed in the inner peripheral surface of a junction between the pair of casings 17a and 17b (see FIG. 4B). Accordingly, the engagement portion 19 is engaged with the to-be-engaged-portions 21a and 21b so as to be fixed at a position constituting a portion of the device main body surface, and is engaged with a to-be-engaged-portion 21c on a side opposite to the to-be-engaged-portions 21a and 21b so as to be fixed at a position which is maximally rotated (see FIG. 5B).

In the rotation terminal device for portable terminals 10 configured in this manner, the terminal holder 11 is configured such that the terminal 15 protrudes on the front surface side of the device main body 12 in a use state of the terminal holder, and the decorative surface 14 appears on the front surface side to constitute a portion of the surface of the device main body 12 in a non-use state of the terminal holder. The non-use state is illustrated in FIG. 2, and the engagement portion 19, 19 is stabilized by being engaged with the to-be-engaged-portions 21a and 21b at the ends of the engagement portion sliding grooves 20a and 20b. Therefore, the terminal 15 is hidden by the decorative surface 14 appearing on the front surface, and is thus protected from contamination or damage, and aesthetic properties of the appearance are not also impaired.

Figure 5A:
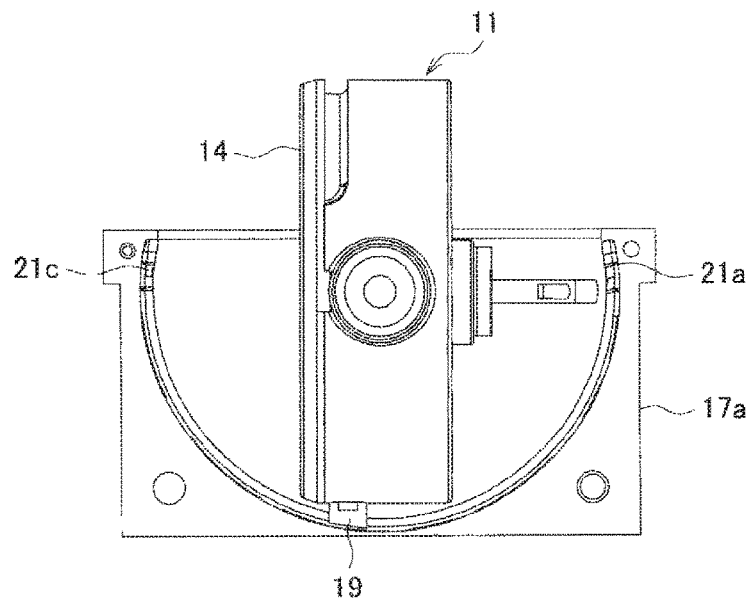
FIG. 5A illustrates a state during the rotation of the terminal holder.
Figure 5B:
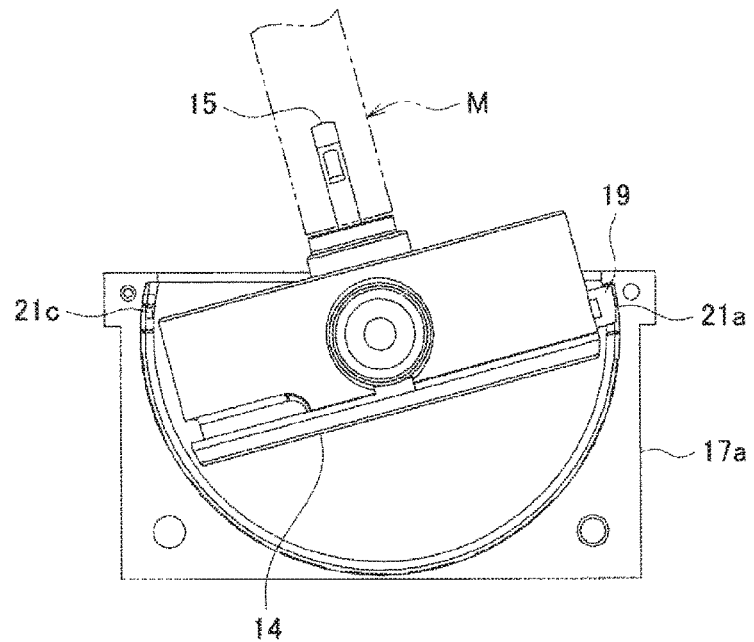
FIG. 5B is a cross-sectional view illustrating a maximum rotation state of the terminal holder.

From this state, it is possible to push down and rotate the end of the terminal holder 11 on the left side of each drawing, and the midway state is illustrated in FIG. 5A. During the rotation, the engagement portion 19 slides in the engagement portion sliding grooves 20a and 20b and is engaged with the to-be-engaged-portions 21a and 21b at the ends of the engagement portion sliding grooves 20a and 20b on the left side, as illustrated in FIG. 5B, in a state where the terminal holder is maximally rotated, and thus the terminal 15 is stabilized in a protruding state.

Figure 4A:
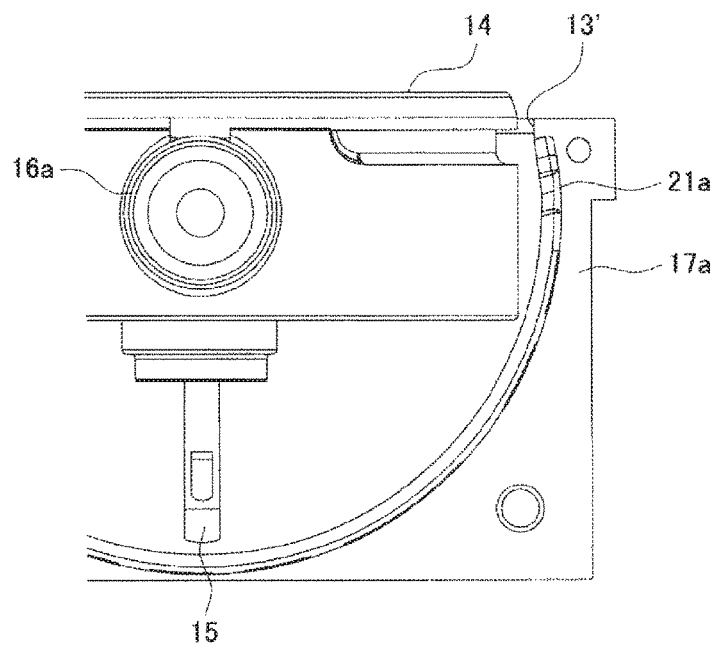
FIG. 4A is a partial cross-sectional view illustrating an example of a to-be-engaged-portion.
Figure 4A:
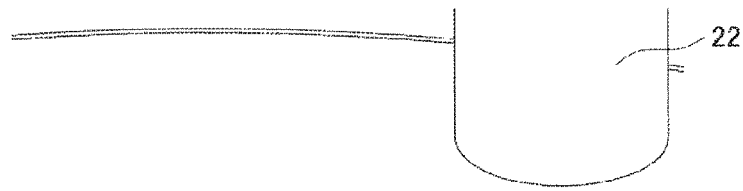
Figure 4B:
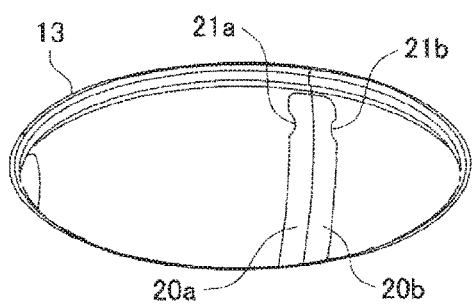
FIG. 4B is a partial perspective view.

When the terminal 15 is set to be in a protruding state, a portable terminal M can be connected to a socket, which allows the charging of the portable terminal M and data communication by the electrical conduction of the wiring cord 18. In the state illustrated in FIG. 5B, the portable terminal M is slightly inclined to the left but is stabilized. Accordingly, any trouble does not occur in a case of a lightweight portable terminal M, but the portable terminal can be supported at the back thereof by providing a supporting body 22 as illustrated in FIGS. 1 and 4B.

When the device main body 12 is provided with the supporting body 22 and the portable terminal M is connected to the terminal 15, the supporting body 22 can be configured to function as a support that supports the portable terminal M at the back thereof. The terminal holder 11 can be stopped at any rotation position, and a change in the angle of backward inclination, which varies depending on a difference in the size of the portable terminal M, is adjusted by the rotation mechanism 16 of the terminal holder 11 of the rotation terminal device for portable terminals according to the invention (see FIG. 1).

A stopper 22a is provided in the supporting body 22 so as to be vertically slidable. That is, the supporting body 22 has a uniform cross-sectional shape, and the stopper 22a is provided so as to be vertically movable with the supporting body 22 as the axis thereof. Accordingly, when the back of the portable terminal M is supported by the supporting body 22, the supporting body 22 acts to hold the portable terminal M on the upper portion. Even when the portable terminal is held, it is not necessary to make the sliding of the stopper 22a tight, and it is desired that the supporting body is formed to have a shape and a structure that does not damage the portable terminal M.

Figure 6:
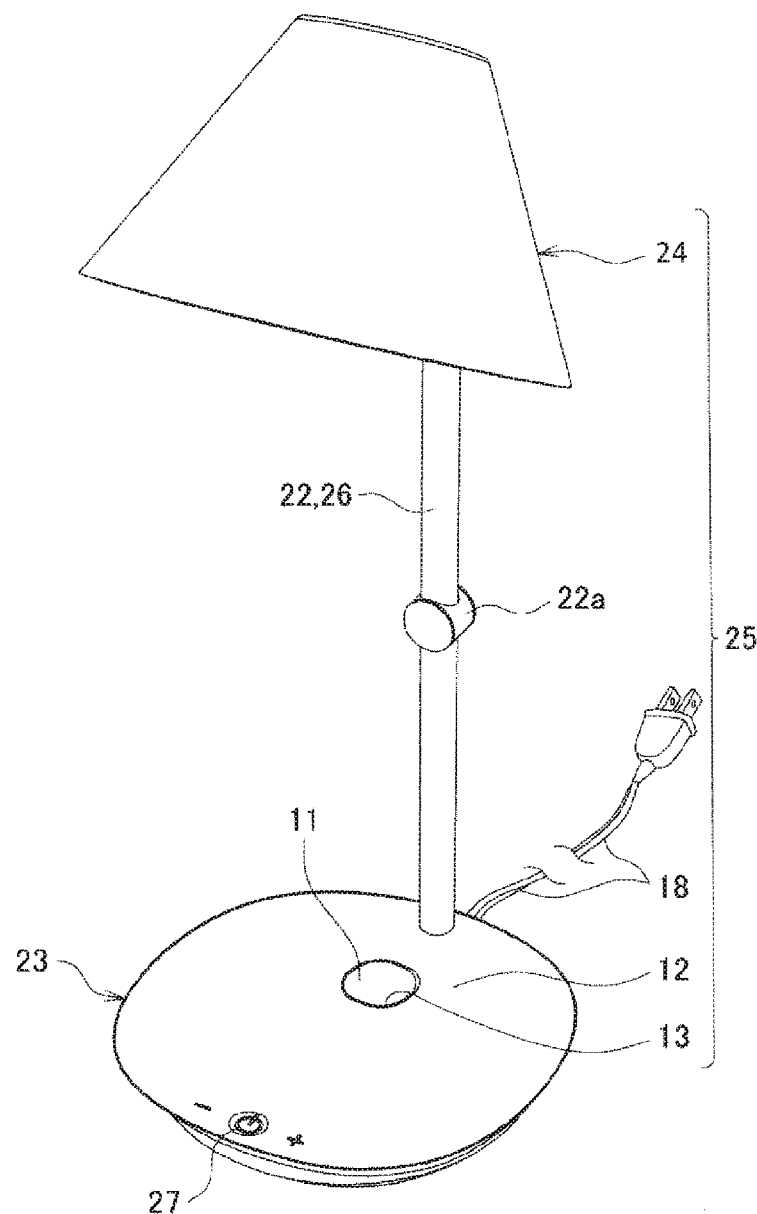
FIG. 6 is a perspective view illustrating an example of an electric lamp including the rotation terminal device for portable terminals according to the invention.

Further, according to the invention, it is possible to configure an electric lamp 25 that includes a base 23 for use on a desk, a floor, and the like and an illumination unit 24 provided on the base 23, and includes the rotation terminal device for portable terminals 10 embedded in the base 23. The electric lamp 25 is illustrated in FIG. 6.

The base 23 also serves as the device main body 12 and is provided with a column 26 also serving as the supporting body 22, and the illumination unit 24 is provided in the upper portion of the column 26. Reference numeral 27 denotes a switch that controls electrical conduction of a circuit including the terminal 15 and the illumination unit 24. According to the electric lamp 25 of the invention which is configured in this manner, the decorative surface 14 appears on the surface of the base 23 in a non-use state of the terminal, and thus appearance is not impaired. In addition, the terminal 15 is exposed upward only in a use state, and thus it is possible to perform work such as the charging of the portable terminal M and data communication.

REFERENCE NUMBERS

10: ROTATION TERMINAL DEVICE FOR PORTABLE TERMINALS
11: TERMINAL HOLDER
12: DEVICE MAIN BODY
13: OPENING
14: DECORATIVE SURFACE
15: TERMINAL
16: ROTATION MECHANISM
17a, 17b: CASING
18: WIRING CORD
19: ENGAGEMENT PORTION
20a, 20b: ENGAGEMENT PORTION SLIDING GROOVE
21a, 21b: TO-BE-ENGAGED-PORTION
22: SUPPORTING BODY
23: BASE
24: ILLUMINATION UNIT
25: ELECTRIC LAMP
26: COLUMN
27: SWITCH

The invention claimed is:

1. A terminal device which is used for purposes including charging of portable terminals and data communication, the device comprising:
   a terminal holder that includes at least one terminal; and
   a device main body that includes an opening for mounting the terminal holder,
   wherein the terminal holder is configured such that a decorative surface constituting a portion of the device main body is provided on one surface of the terminal holder and the terminal is provided on the other surface thereof, the terminal holder is rotatably attached to the device main body by a rotation mechanism, and is configured such that the terminal protrudes on a front surface side of the device main body in a use state of the terminal holder and the decorative surface appears on the front surface side to constitute the portion of the device main body in a non-use state of the terminal holder;
   wherein the one surface of the terminal holder is parallel to the other surface of the terminal holder; and
   wherein the rotation mechanism has an axis around which the terminal holder rotates and the axis is parallel to both the one surface and the other surface of the terminal holder.

2. The terminal device for portable terminals according to claim 1,
   wherein the terminal holder includes an engagement portion, and the device main body includes a to-be-engaged-portion to be engaged with the engagement portion within the opening of the device main body, so that terminal holder is configured to be fixed at a position where the terminal appears on the front surface side or at a position where the decorative surface appears by the engagement between the engagement portion and the to-be-engaged-portion.

3. An electric lamp comprising:
   a base for use on a desk, or a floor;
   an illumination unit which is provided on the base; and
   the rotation terminal device for portable terminals according to claim 1 which is embedded in the base, wherein the base also serves as the device main body, the base is provided with a column that also serves as the supporting body, and the illumination unit is provided in an upper portion of the column.

4. A terminal device which is used for purposes including charging of portable terminals and data communication, the device comprising:

a terminal holder that includes at least one terminal; and a device main body that includes an opening for mounting the terminal holder, wherein the terminal holder is configured such that a decorative surface constituting a portion of the device main body is provided on one surface of the terminal holder and the terminal is provided on the other surface thereof, the terminal holder is rotatably attached to the device main body by a rotation mechanism, and is configured such that the terminal protrudes on a front surface side of the device main body in a use state of the terminal holder and the decorative surface appears on the front surface side to constitute the portion of the device main body in a non-use state of the terminal holder;

wherein the device main body includes a supporting body, the supporting body functions as a support that supports the portable terminal at a back thereof when the portable terminal is connected to the terminal, and a change in an angle of backward inclination, which varies depending on a difference in a size of the portable terminal, is adjusted by the rotation mechanism of the terminal holder, and wherein the supporting body includes a stopper that holds the portable terminal in an upper portion of the supporting body.

* * * * *